United States Patent [19]

Motoori et al.

[11] 4,264,164
[45] Apr. 28, 1981

[54] MEMORY HOLDING DEVICE IN A SINGLE LENS REFLEX CAMERA

[75] Inventors: Ryuzo Motoori, Kawasaki; Sakuji Watanabe, Warabi; Yoshiaki Ohtsubo, Kawasaki, all of Japan

[73] Assignee: Nippon Kogaku K.K., Tokyo, Japan

[21] Appl. No.: 74,919

[22] Filed: Sep. 13, 1979

[30] Foreign Application Priority Data

Sep. 13, 1978 [JP] Japan .................................. 53-111776
Sep. 13, 1978 [JP] Japan .................................. 53-111777

[51] Int. Cl.³ ............................................. G03B 7/083
[52] U.S. Cl. ..................................... 354/51; 354/60 E
[58] Field of Search ..................... 354/60 L, 60 E, 53, 354/48, 38, 50, 51, 43, 23 D, 29, 289, 60 R, 152

[56] References Cited

U.S. PATENT DOCUMENTS 3,829,867  8/1979  Oho ..................................... 354/29 X
4,084,166  4/1978  Kawasaki et al. ............. 354/60 L X Primary Examiner—L. T. Hix
Assistant Examiner—W. J. Brady
Attorney, Agent, or Firm—Fitzpatrick, Cella, Harper & Scinto

[57] ABSTRACT

In a single lens reflex camera having a movable mirror, a metering circuit, a circuit for operating a proper exposure value in accordance with the metering output of the metering circuit, a circuit for storing the output of the operation circuit, display means and operating switch means, holding means is provided for holding the output of the memory circuit at a value before the return of the mirror to its normal position for a predetermined period of time after the mirror has returned to its normal position and for applying the held output to the display means.

4 Claims, 5 Drawing Figures

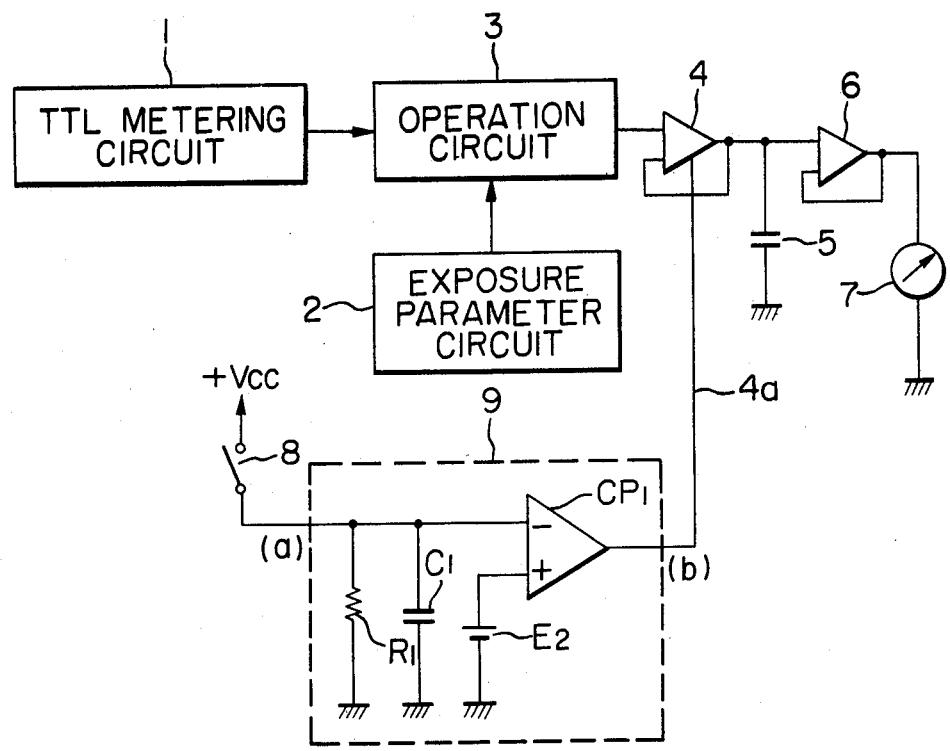
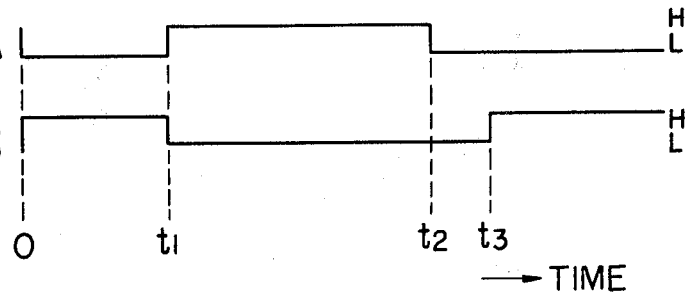

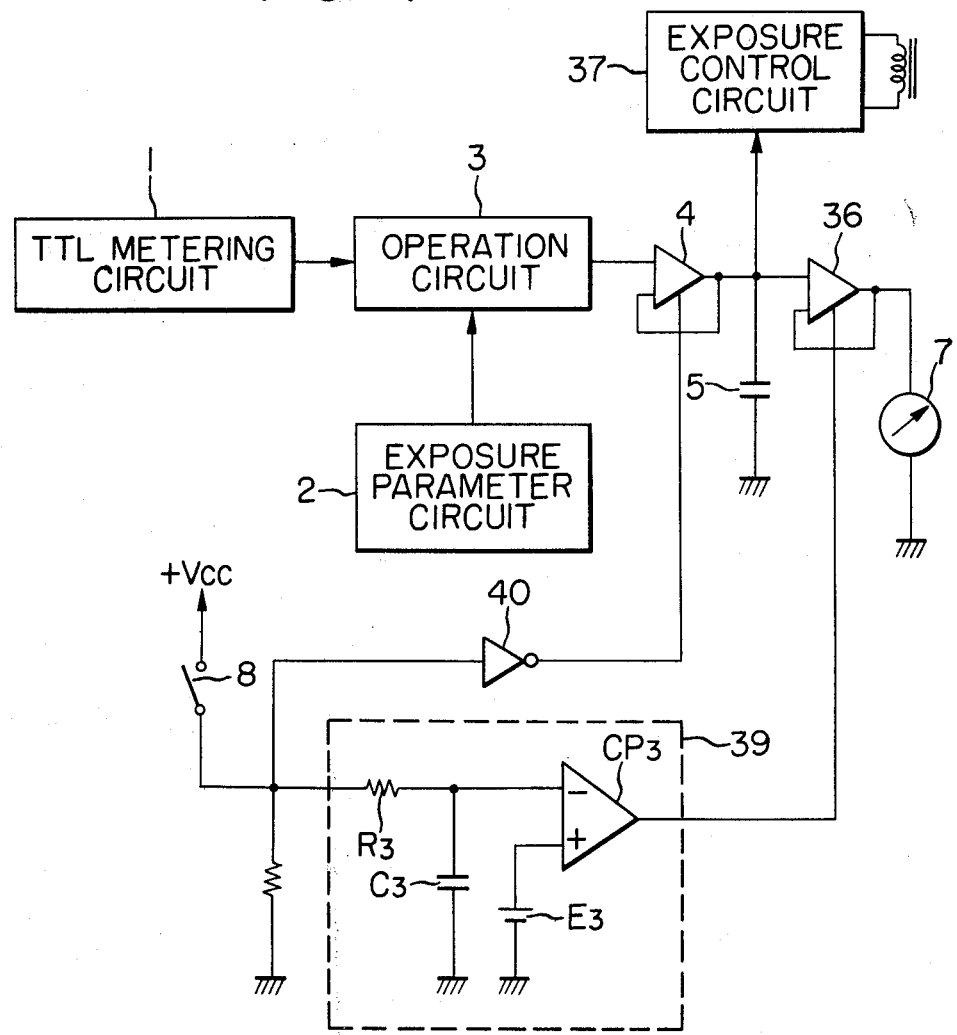

MEMORY HOLDING DEVICE IN A SINGLE LENS REFLEX CAMERA

BACKGROUND OF THE INVENTION

1. Field of the Invention

This invention relates to a memory holding device in a single lens reflex camera.

2. Description of the Prior Art

In a single lens reflex camera, a display device for displaying the shutter speed or the aperture value for obtaining a proper exposure by metering the object light reflected by a mirror to a finder, by a metering circuit, is known. In such a display device, the value metered by the metering circuit is varied during the upward or downward movement of a quick return mirror to fluctuate the display and for this reason, a memory circuit becoming operative immediately before the mirror is retracted from its normal position for directing the object light to the finder and becoming inoperative in response to the return movement of the mirror to its normal position has been connected between the metering circuit and the dislay device.

However, the mirror bounces at the completion of its return movement and therefore, even after the memory circuit has become inoperative, the value metered by the metering circuit often fluctuates. The fluctuation of the display resulting from this has given an unpleasant impression to the observer.

Further, in an automatic exposure control type camera wherein a capacitor is used as the memory circuit and the terminal voltage of the capacitor provides the input to the exposure control circuit and the display device, the terminal voltage of the capacitor is applied to the display device even after the mirror has been retracted from its normal position by shutter release and this has caused the terminal voltage to be reduced by a leakage current, thus adversely affecting the exposure control.

SUMMARY OF THE INVENTION

It is an object of the present invention to provide a memory holding circuit in a single lens reflex camera which eliminates the tremble of the display resulting from the bounce of the mirror.

It is another object of the present invention to provide a memory holding circuit which prevents any fluctuation of the stored value resulting from the leakage of a current from a capacitor included in the memory circuit which takes place after the mirror has been retracted from the light path.

The invention will become fully apparent from the following detailed description of some embodiments thereof taken in conjunction with the accompanying drawings.

BRIEF DESCRIPTION OF THE DRAWINGS

FIG. 1 is a circuit diagram showing a first embodiment of the present invention.

FIGS. 2A and 2B show the timing in the embodiment of FIG. 1.

FIG. 4 is a circuit diagram showing a third embodiment of the present invention.

DESCRIPTION OF THE PREFERRED EMBODIMENTS

Figure 3:
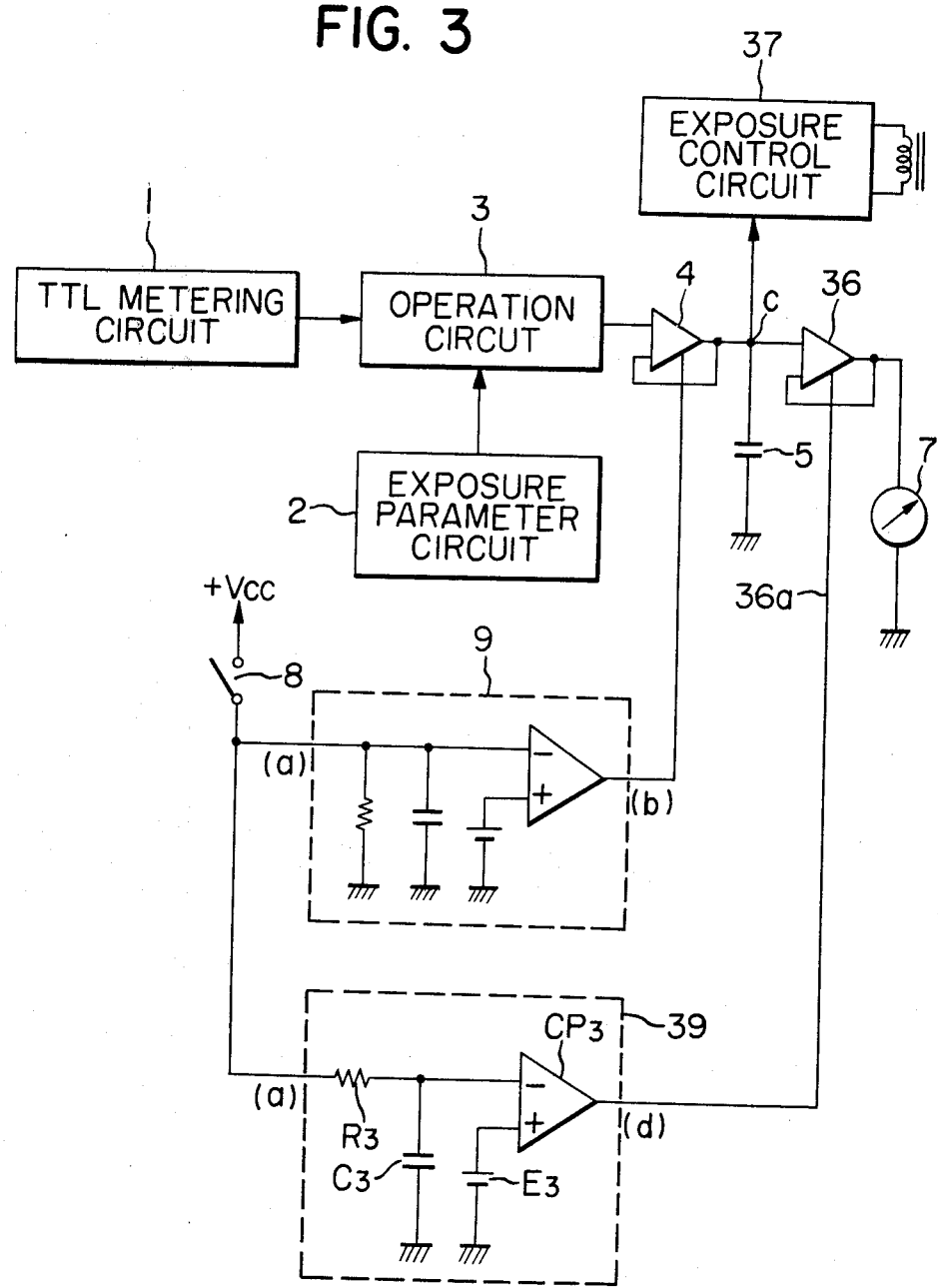
FIG. 3 is a circuit diagram showing a second embodiment of the present invention.

Referring to FIG. 1 which shows a first embodiment of the present invention, a TTL metering circuit 1 has a photoelectric element and may meter the light from a finder light path and generate a metering output corresponding to the brightness of an object. An exposure parameter circuit 2 may generate an exposure information output corresponding to the film speed and the aperture value (in the case of the aperture priority photography mode) or the shutter speed (in the case of the shutter speed priority photography mode). An operation circuit 3 may generate, from the metering output and the exposure information output, an operation output corresponding to the shutter speed for obtaining a proper exposure (in the case of the aperture priority photography mode) or the aperture value (in the case of the shutter speed priority photography mode). The operation output is stored as a charging voltage in a memory capacitor 5 through a memory analog switch 4 and is applied to an exposure display meter 7 through a follower circuit 6. The meter 7 may display a proper exposure value or the propriety of the exposure by the operation output. The analog switch 4 has an enable terminal 4a and may be closed when there is an H-level input to this terminal, and may be opened when there is an L-level input to this terminal.

A memory control switch 8 is operatively associated with the mirror of the camera or a mirror driving mechanism so as to be closed immediately before the mirror is retracted from a normal position for directing the object light to the finder and to be opened in response to the return of the mirror to the normal position. A delay circuit 9 comprises a resistor $R_1$, a capacitor $C_1$, a standard power source $E_1$ and a comparator $CP_1$, and the operation thereof is controlled by the memory control switch 8. The output of the memory control switch 8 is indicated as (a) and the output of the delay circuit 9 is indicated as (b), and their timing is shown by identical characters in the timing chart of FIG. 2.

Operation will now be described by reference to FIG. 2. When the release button of the camera is depressed, the mirror driving mechanism is operated to retract the mirror. On the other hand, the memory control switch 8 is closed at a time $t_1$ immediately before the retraction of the mirror and therefore, the output (a) rises up to the source voltage +Vcc. At this time, the capacitor $C_1$ is charged up to +Vcc. As the result, the output of the comparator $CP_1$, namely, the output (b) of the delay circuit 9 assumes L-level and the analog switch 4 becomes open. Therefore, the memory capacitor 5 stores a charging voltage corresponding to the operation output immediately before the analog switch 4 becomes open, and the displayed value of the meter 7 is fixed.

When the exposure is terminated and the mirror is returned to its initial position, the memory control switch 8 is opened at a time $t_2$ and the output (a) is reduced to L-level. However, the capacitor $C_1$ has been charged up to +Vcc and the charge thereof is discharged through the resistor $R_1$ upon opening of the memory control switch 8 and therefore, the comparator $CP_1$ continues to apply the L-level output to the enable terminal of the analog switch 4 until time $t_3$ whereat the charging voltage of the capacitor $C_1$ reaches the voltage of the standard power source. The time from the time $t_2$ to the time $t_3$ is so determined as to correspond to the period of time until the bounce at the termination of the return of the mirror is stopped. Accordingly, during the bounce of the mirror, the analog switch 4 is in OFF state and therefore, the displayed value of the meter 7 during this period of time corresponds to the charging voltage of the memory capacitor 5, thus preventing the tremble of the meter pointer. When the time $t_3$ is passed after the return of the mirror, the output of the comparator circuit $CP_1$ assumes H-level and as the result, the analog switch 4 becomes closed and the storage operation of the memory capacitor is released. Thereafter, the meter 7 effects the exposure display in accordance with the operation output. The operational effect of the present invention does not change even if the meter 7 employs the light-emission display effected by LED or the like.

A second embodiment of the present invention is shown in FIG. 3. The second embodiment is constructed so as to more positively prevent the leakage current to the meter 7 which is a display device. In FIG. 3, elements similar to those of FIG. 1 are designated by similar reference characters. The operation output from the operation circuit 3 is stored as the charging voltage in the memory capacitor 5 through the memory analog switch 4 and also applied to the display meter 7 through an analog switch 36. The analog switch 36 has an enable terminal 36a and may be closed when there is an H-level input to this terminal, and may be opened when there is an L-level input to this terminal. The output end of the memory capacitor 5 is connected to an exposure control circuit 37.

Connected to one terminal of the memory control switch 8, in parallelism to the delay circuit 9, is a second delay circuit 39 comprising a resistor $R_3$, a capacitor $C_3$, a comparator $CP_3$ and a standard power source $E_3$. The output of the comparator $CP_3$, namely, the output of the second delay circuit, is connected to the enable terminal of the analog switch 36.

Operation of the second embodiment will now be described. As in the first embodiment, when the release button of the camera is depressed and the memory control switch 8 is closed immediately before the mirror is retracted, the output of the delay circuit 9 assumes L-level and the memory capacitor 5 stores the operation output immediately before the analog switch 4 is opened. The exposure control circuit 37 effects exposure control (for example, shutter speed control) in accordance with the operation output stored in the memory capacitor 5.

On the other hand, when the memory control switch 8 has been closed, the $\ominus$ input voltage of the comparator $CP_3$ is reduced below the $\oplus$ input voltage and therefore, the output of the second delay circuit 39 assumes H-level and the analog switch 36 is in ON state. After the lapse of the time constant determined by the resistor $R_3$ and the capacitor $C_3$, the output of the second delay circuit 39 assumes L-level and the analog switch 36 becomes open. That is, the memory capacitor 5 becomes electrically insulated from the operation circuit 3 and the meter 7 by the analog switches 4 and 36, thus preventing reduction of the charging voltage.

The shorter is the time from the closing of the memory control switch 8 till the opening of the analog switch 36, the better, but when the controlled shutter speed is, for example, between 1/1000 to 1/30 sec., it is preferable in observation that the display by the meter is held by the ON state of the analog switch 36, because the display before the retraction of the mirror and after the return of the mirror is substantially constant in that case.

That is, at this time, the delay circuit 39 achieves the display holding function by holding the analog switch 36 in ON state to such an extent that the current leakage of the capacitor 5 offers no problem in shutter speed control and thereafter, prevents the display in the manner as already described.

FIG. 4 shows a third embodiment of the present invention. Instead of the delay circuit 9 in FIG. 3, an inverter 40 is connected between the memory control switch 8 and the enable terminal of the analog switch 4 to obtain the same effect as that attained by the second embodiment.

We claim:
1. In a single lens reflex camera having:
a movable mirror for directing the light from an object to a finder when said mirror is in its normal position;
a metering circuit for metering the reflected light from said mirror and generating a metering output corresponding to the brightness of the object;
a circuit for operating a proper exposure value in accordance with said metering output;
a memory circuit including a capacitor, for storing the output of said operation circuit;
an exposure control circuit operable in response to the output of said capacitor;
display means; and
operating switch means changeable over immediately before said mirror is retracted from said normal position and when said mirror has returned to said normal position to selectively apply the output of said operation circuit to said display means when said mirror is in said normal position and the output of said memory circuit to said display means when said mirror is retracted from said normal position;
the improvement comprising:
holding means for holding the output of said memory circuit at a value before the return of said mirror for a predetermined period of time after said mirror has returned to said normal position and for applying the stored output to said display means, said predetermined period of time being determined so as to correspond to the time required for stopping a fluctuation of said metering output at least upon completion of the return of said mirror to be stopped, and blocking means operatively associated with said operating switch means so as to block the application of the output of said memory circuit to said display means when said mirror has been retracted from said normal position.
2. A single lens reflex camera according to claim 1, wherein said holding means includes:
analog switch means connected between said operation circuit and said memory circuit; and
control means operatively associated with said operating switch means so as to open said analog switch means immediately before said mirror is retracted from said normal position and to close said analog switch means when a predetermined period of time has elapsed after the completion of said return.
3. A single lens reflex camera according to claim 2, wherein said control means includes a delay circuit.
4. A single lens reflex camera according to claim 1, wherein said blocking means includes:
analog switch means connected between said capacitor and said display means; and
control means operatively associated with the actuation of said mirror immediately before said retraction from said normal position so as to open said analog switch means.

* * * * *